(12) United States Patent
Murray et al.

(10) Patent No.: US 9,720,669 B2
(45) Date of Patent: Aug. 1, 2017

(54) DEPLOYMENT OF SOFTWARE ACROSS AN ENTERPRISE SYSTEM

(71) Applicant: The Boeing Company, Chicago, IL (US)

(72) Inventors: Kenneth Todd Murray, Kenmore, WA (US); Miroslav Iordanov Spassov, Kenmore, WA (US); Alexander James Mitchell, Renton, WA (US)

(73) Assignee: The Boeing Company, Chicago, IL (US)

( * ) Notice: Subject to any disclaimer, the term of this patent is extended or adjusted under 35 U.S.C. 154(b) by 553 days.

(21) Appl. No.: 13/905,475

(22) Filed: May 30, 2013

(65) Prior Publication Data

US 2014/0359603 A1 Dec. 4, 2014

(51) Int. Cl.
*G06F 9/445* (2006.01)
*G06F 9/44* (2006.01)

(52) U.S. Cl.
CPC . *G06F 8/60* (2013.01); *G06F 8/68* (2013.01)

(58) Field of Classification Search
CPC ..................................... G06F 8/60; G06F 8/68
USPC .......................................................... 717/177
See application file for complete search history.

(56) References Cited

U.S. PATENT DOCUMENTS

| | | | |
|---|---|---|---|
| 5,155,847 A * | 10/1992 | Kirouac | G06F 8/65 709/221 |
| 5,832,520 A * | 11/1998 | Miller | |
| 6,075,943 A * | 6/2000 | Feinman | G06F 8/61 717/175 |
| 6,658,423 B1 | 12/2003 | Pugh et al. | |
| 6,966,058 B2 | 11/2005 | Earl et al. | |
| 7,360,212 B2 * | 4/2008 | Blake | G06F 8/61 717/175 |
| 7,366,718 B1 * | 4/2008 | Pugh | G06F 17/3071 |
| 7,899,809 B2 * | 3/2011 | Lecha et al. | 707/713 |
| 8,438,558 B1 * | 5/2013 | Adams | G06F 8/68 717/168 |
| 8,607,213 B2 * | 12/2013 | Butler | G06F 8/61 717/168 |
| 8,799,662 B2 * | 8/2014 | Muzammil | H04L 9/3236 713/176 |
| 9,372,992 B1 * | 6/2016 | Grandle | G06F 21/57 |
| 2003/0101162 A1 * | 5/2003 | Thompson | G06F 17/30097 |

(Continued)

OTHER PUBLICATIONS

Scooter Software, "Beyond Compare: The compare, merge and synchronize utility from Scooter Software," http://www.scootersoftware.com/moreinfo.php.

(Continued)

*Primary Examiner* — Marina Lee
(74) *Attorney, Agent, or Firm* — Miller, Matthias & Hull LLP

(57) ABSTRACT

Software is prepared for deployment across an enterprise system. The software initially included a base package and now includes an extended package. The extended package includes duplicate files and new files with respect to the base package. A method comprises using a computer to create indices of files for each of the base and extended packages, the indices identifying properties of the files; compare the properties of the files listed in the indices to identify the duplicate files and the new files in the extended package; and create a deployment package that includes only the new files.

13 Claims, 5 Drawing Sheets

(56) References Cited

U.S. PATENT DOCUMENTS

| | | | | |
|---|---|---|---|---|
| 2005/0278718 | A1* | 12/2005 | Griffith et al. | 717/175 |
| 2007/0169081 | A1* | 7/2007 | Zhao et al. | 717/168 |
| 2007/0234334 | A1* | 10/2007 | Araujo et al. | 717/168 |
| 2007/0240151 | A1* | 10/2007 | Marl et al. | 717/174 |
| 2007/0283343 | A1* | 12/2007 | Aridor et al. | 717/174 |
| 2008/0162478 | A1* | 7/2008 | Pugh | G06F 17/3071 |
| 2009/0271782 | A1* | 10/2009 | Ciudad | G06F 8/60 |
| | | | | 717/174 |
| 2012/0066680 | A1* | 3/2012 | Amano et al. | 718/1 |
| 2012/0131566 | A1* | 5/2012 | Morgan | G06F 8/65 |
| | | | | 717/170 |
| 2012/0204170 | A1* | 8/2012 | Giusti | 717/172 |
| 2013/0055231 | A1 | 2/2013 | Hyndman et al. | |
| 2013/0066901 | A1 | 3/2013 | Marcelais et al. | |
| 2013/0104115 | A1 | 4/2013 | Bertrand et al. | |
| 2014/0032915 | A1* | 1/2014 | Muzammil | H04L 9/3236 |
| | | | | 713/176 |

OTHER PUBLICATIONS

Canadian Office Action Application No. 2847393 reported on May 10, 2016.
Canadian Office Action for Related Patent Application No. 2,847,393; Report dated Apr. 11, 2017.

\* cited by examiner

DEPLOYMENT OF SOFTWARE ACROSS AN ENTERPRISE SYSTEM

BACKGROUND

Companies in the aerospace, automotive and shipbuilding industries use commercial CAD/CAM software for multiple stages of product development, including conceptualization, design, manufacturing, and engineering. Thousands of end users across an enterprise system may contribute to the development of a product.

A commercial vendor may provide CAD/CAM software as a base package. A base configuration of the software is installed on each end user's computer by installing the base package.

New functionality may thereafter be added to the base configuration by installing extended packages. Typically, each extended package contains all files of the previous package plus additional files. The base configuration may be upgraded by installing a first extended package. Later, the upgraded configuration may be further upgraded by installing a second extended package, and so on.

Each extended package replaces all previous files. Reconfiguration and verification can take time. Errors can occur. An earlier configuration that was functioning properly might no longer function properly. In an enterprise system having thousands of end users, reconfiguration and verification can be costly.

A better approach is desirable.

SUMMARY

According to an embodiment herein, a method prepares software for deployment across an enterprise system. The software includes a base package and an extended package, the extended package including duplicate files and new files with respect to the base package. The method comprises using a computer to create indices of files for each of the base and extended packages, the indices identifying properties of the files; compare the properties of the files listed in the indices to identify the duplicate files and the new files in the extended package; and create a deployment package that includes only the new files.

According to another embodiment herein, a system comprises a computer programmed to create indices of files for an extended software package and a previous package, the indices identifying properties of the files. The extended package includes all files of a previous package plus new files. The computer is further programmed to compare the properties of the files listed in the indices to identify the duplicate files and the new files in the extended package; and create a deployment package that includes only the new files in the extended package.

According to another embodiment herein, a product comprises computer-readable memory encoded with data for causing a computer to identify properties of all files in an extended software package, the extended package including all files of a previous package plus new files; compare the properties of the files to identify all duplicate files in the extended package; and create a deployment package that includes only the new files in the extended package.

These features and functions may be achieved independently in various embodiments or may be combined in other embodiments. Further details of the embodiments can be seen with reference to the following description and drawings.

DETAILED DESCRIPTION

Figure 1:
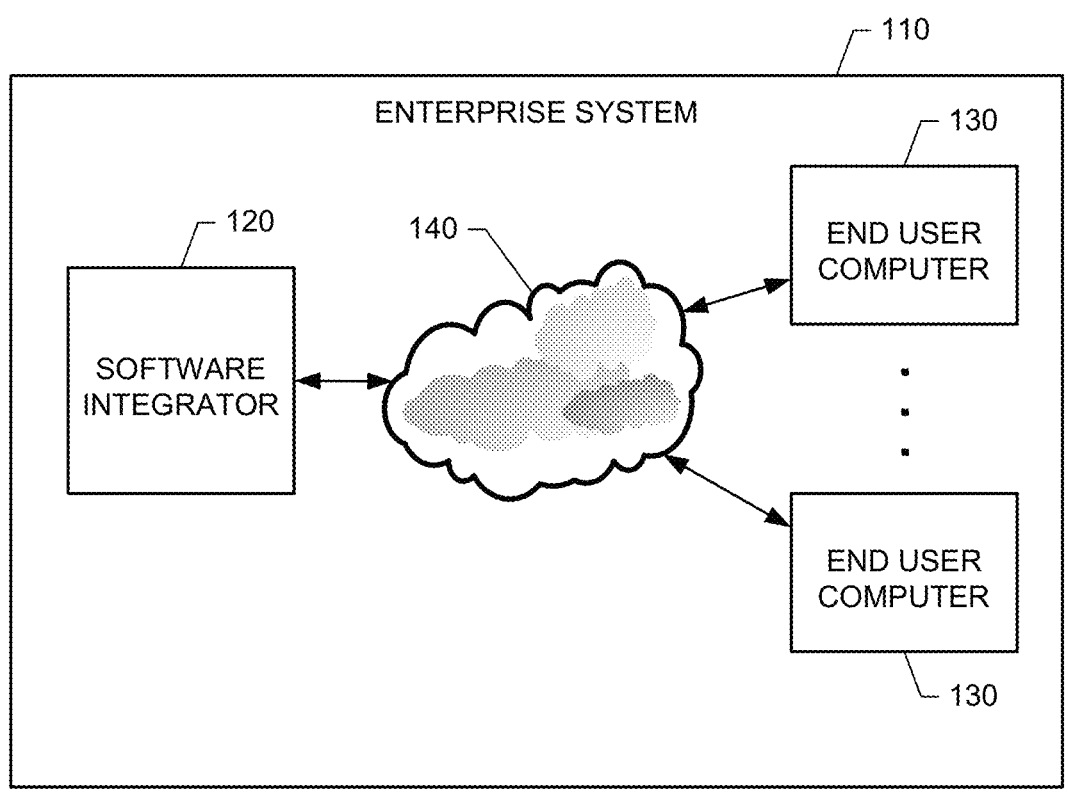
FIG. 1 is an illustration of an enterprise system including a software integrator and end user computers.

Reference is made to FIG. 1, which illustrates an enterprise system 110 including a computer system referred to as a software integrator 120, which communicates with a plurality of end user computers 130 via a network 140. There may be thousands of end user computers 130 in the enterprise system 110. As but one example, the software integrator 120 distributes commercial CAD/CAM software to the end user computers 130. The end user computers 130 may use the commercial CAD/CAM software for product development.

The software is initially deployed as a base package, and the base package is installed on each of the end user computers 130. Over time, the software integrator 120 may provide upgraded software to some or all of those end user computers 130. The upgrades may be provided in the form of extended packages.

Figure 2:
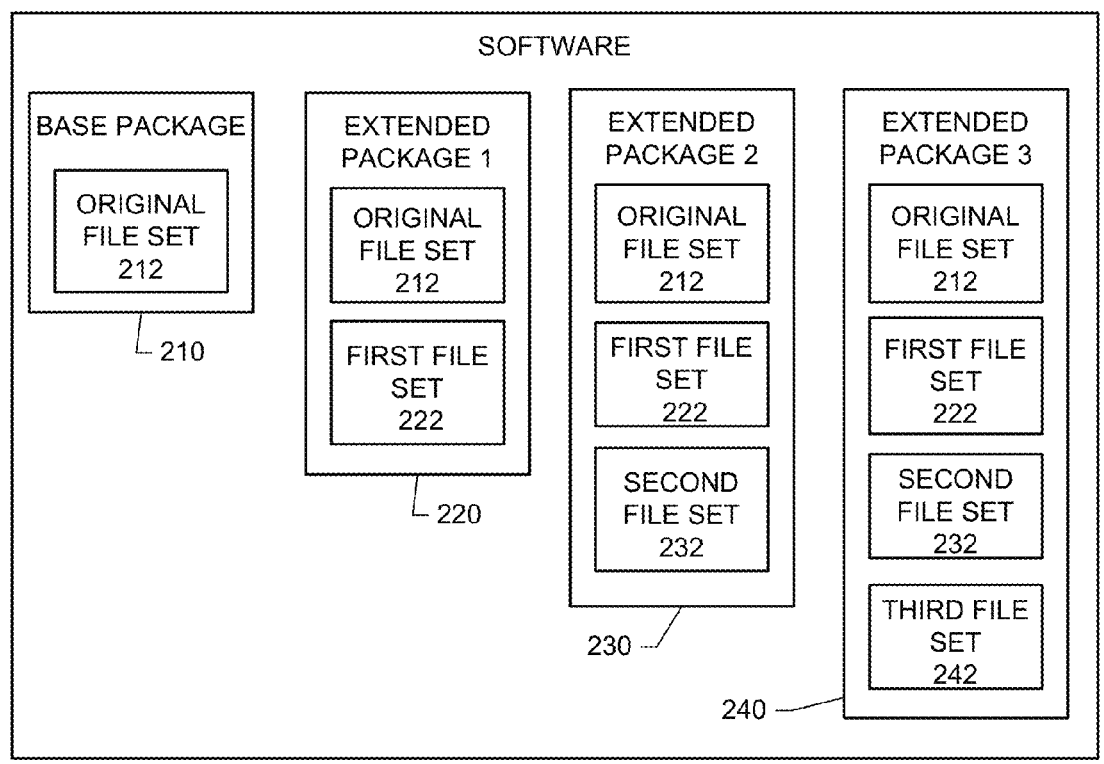
FIG. 2 is an illustration of a base package and several extended packages.

Additional reference is made to FIG. 2, which illustrates different packages for the software. The packages include a base package 210, a first extended package 220, a second extended package 230, and a third extended package 240. The three extended packages 220-240 are illustrated only as an example. In practice, there may be include a base package 210 and one or more extended packages.

The base package 210 contains an original set 212 of files. The first extended package 220 contains the original set 212 of files as well as a first set 222 of new files. The second extended package 230 contains the original and first sets 212 and 222, as well as a second set 232 of new files. The third extended package 240 contains the original, first and second sets 212, 222 and 232, as well as a third set of new files 242.

To perform the upgrades, the distribution computer does not send the extended packages to the end user computers 130. Rather, it sends deployment packages that only include new files. The software on the end user computer is enhanced (e.g., new functionality is added) by only installing the new files.

Figure 3:
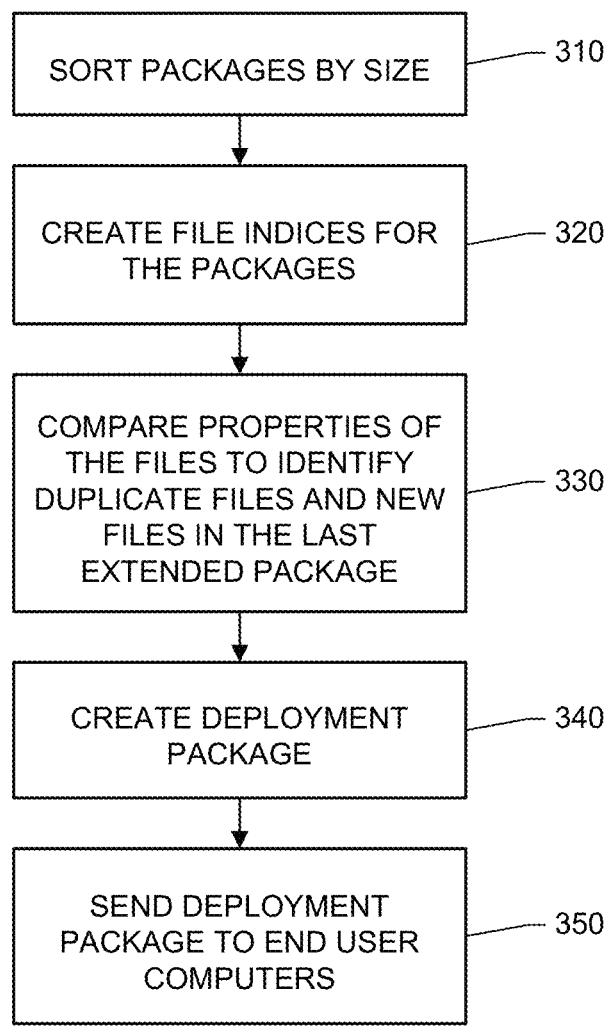
FIG. 3 is an illustration of a method of preparing software for deployment across an enterprise system.

Reference is now made to FIG. 3, which illustrates a method for preparing the deployment packages from the base package and extended packages. The method may be performed by the software integrator 120.

At block 310, the packages are sorted by size in order to compare them. The sorting is performed to identify the base package and the order of extended packages. The base package will be smallest, and each subsequent package will be larger than the previous one.

At block 320, indices of files are created for each of the base and extended packages. Each index identifies properties of the files in a package. Examples of the properties include, without limitation, file name and file size.

Another property may be a unique identifier. For instance, a cryptographic hash function may be computed for each file. Each file has a unique cryptographic hash function. For instance, a cryptographic hash function such as MD5 Message-Digest Algorithm (checksum) may be computed. An MD5 hash of a file may be computed by encoding the file's content into a 128-bit fingerprint.

At block 330, properties of the files listed in the indices are compared to identify the duplicate files and the new files in the extended package. For instance, the cryptographic hash functions may be compared to identify the new and extended files.

At block 340, a deployment package that includes only the new files is created. A block 350, the deployment package is sent to end user computers in the enterprise system. The end user computers perform upgrades by installing only the new files rather than installing a new extended package.

Consider the software illustrated in FIG. 2. After the base package 210 has been deployed and installed, new applications and new functionality are developed. The software vendor makes these new applications and functionality available in the new files 222 of the first extended package 220. The method of FIG. 3 is performed on base and extended packages 210 and 220 to produce a first deployment package. The first deployment package contains only the new files 222.

Later, the second extended package 230 is made available by the software vendor. The method of FIG. 3 is performed on the first and second extended packages 220 and 230 to produce a second deployment package. The second deployment package contains only the new files in the second extended package 230.

Later, the third extended package 240 is made available by the software vendor. The method of FIG. 3 is performed on the second and third extended packages 230 and 240 to produce a third deployment package. The third deployment package contains only the new files in the third extended package 240.

As a result, a layered approach is enabled towards upgrades in that incremental packages are added to provide new applications and functionality. Rather than each end user installing an extended package, the end user computer installs only those files that were not contained in the previous package. Reconfiguration errors are avoided, and verification time is reduced, since a complete configuration is not being installed. If an earlier configuration is functioning, it continues functioning because its files are not replaced. Only the new files are installed. Other advantages include reducing network traffic, saving hard disk space on end user computers, and reducing server space needed to store multiple configurations. These savings might seem trivial for a single end user computer, but they are significant for packages containing millions of files and an enterprise system having thousands of end user computers.

Significant time and resources are also saved in generating the deployment packages. A method herein is much faster and less error prone than using commercial software to process several gigabytes of data to manually compare files in packages containing millions of files, and then distributing only those files that are not duplicates.

The sorting at block 310 may be used to create "unlinked" deployment packages. "Unlinked" means that any combination of the deployment packages may be installed. In contrast, extended packages are linked in that they require each extended package to include the base files, and all earlier packages must be installed prior to installing the latest extended package.

Typically, the software in each end user computer will be updated by installing the first deployment package, then the second deployment package, then the third deployment package, and so on. However, a method herein is not so limited. In some instances, an end user computer may skip one or more extended packages. For example, a base configuration is upgraded with the first deployment package and later the third deployment package, but not the second deployment package.

A method herein is not limited to any particular type of software deliverable. As but one example, the software may be CAD/CAM software. For the design of a complex product such as an aircraft, each package may contain hundreds of thousands of files, and may be used by thousands of end users.

As another example, a method herein may be used to update documentation. After a base package is installed, files in any of the extended packages may subsequently be installed. Not all files need to be installed. For instance, original files in the base packages and new files in a second extended package are installed, but not new files in a first extended package.

As yet another example, a method herein may be used to update a computer operating system. Only new files are added.

Figure 4:
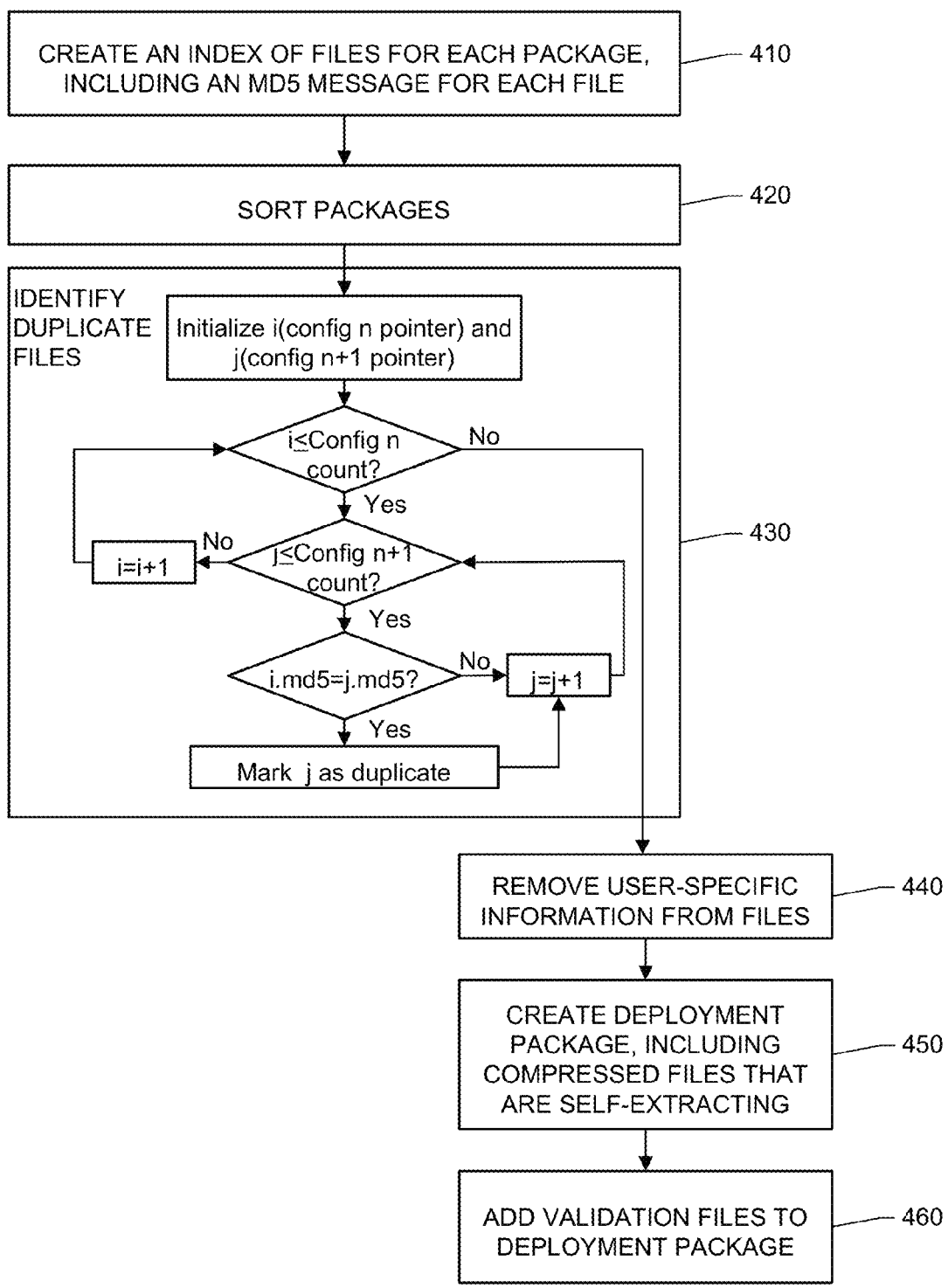
FIG. 4 is an illustration of a method of preparing software for deployment across an enterprise system.

Reference is now made to FIG. 4, which illustrates a more detailed example of a method of preparing software for deployment across an enterprise system. At block 410, indices of files for current and previous packages are created. An MD5 Message is computed for each file. Thus, each file in each index is identified by an MD5 Message. The indices may be in the form of XML files, text files, etc. At block 420, the packages are sorted by size.

At block 430, recursive iteration is performed to identify duplicate files in the indices for the current extended package. The contents of block 430 provide an example of a recursive algorithm.

At block 440, user-specific information is removed from the new files. This will enable an end user to add user-specific information after a deployment package has been installed. This has been found to speed up installation time.

At block 450, a deployment package is created from the new files. This step may include creating compressed files while enforcing number and file size requirements per compressed file according to network constraints and constraints with distribution medium. In some embodiments, deployment package size may be user-defined.

The compressed files may be self-extracting. The self-extracting files enable the upgrading at the end user computer to be fully automatic.

At block 460, validation files may be included in the deployment package. The validation files include a first validation file, which is initially created by the software vendor of a package. The first validation file identifies all files that should be included with the package. After the corresponding deployment package has been installed, the end user computer creates a second file for the installed configuration, and compares the first and second files. If the two files are identical, then installation is successful. Monitoring of the validation by the software integrator is not needed.

Figure 5:
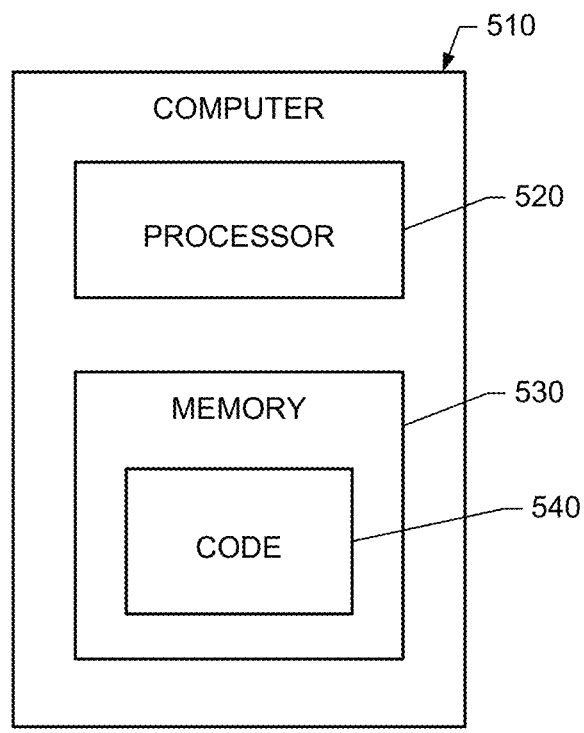
FIG. 5 is an illustration of a computer for preparing software for deployment across an enterprise system.

FIG. 5 is an illustration of a computer 510 for preparing software for deployment across an enterprise system. The computer 510 includes a processor 520 and computer-readable memory 530 encoded with code 540. The code 540, when executed, causes the computer 510 to create indices of files for each of base and extended packages, use the indices to identify duplicate files and new files in each extended package, and create one or more deployment packages including only new files. The software integrator 120 of FIG. 1 may include one or more of these computers 510.

The invention claimed is:

1. A method of preparing software for deployment across an enterprise system, the software including a base package and an extended package, the extended package including duplicate files and new files with respect to the base package, the method comprising using a computer to:
   create indices of files for each of the base and extended packages;
   compute a hash of each one of the files in the indices for each of the base and extended packages to produce a fingerprint for each one of the files;
   iterate the indices of the base and extended packages to identify the duplicate files, wherein the fingerprints are compared to identify the duplicate files and the new files in the extended package; and
   create, at the computer, a deployment package that includes only the new files for installation on an end user computer in the enterprise system wherein the deployment package also includes a first validation file that identifies all files that should be installed on the end user computer; the method further comprising using the end user computer to install the deployment package and create a second validation file for those files actually installed on the end user computer, and compare the first and second files, whereby installation is successful if the first and second validation files are identical.

2. The method of claim 1, further comprising sorting the packages by size.

3. The method of claim 1, further comprising sending the deployment package to a plurality of end user computers in the enterprise system.

4. The method of claim 1, wherein when a new extended package is made available, a new file index is created for the new extended package, and the new file index is compared to file indices of the earlier extended package to identify new files in the new extended package; and wherein a new deployment package is created from only the new files in the new extended package.

5. The method of claim 4, wherein the deployment packages are unlinked.

6. The method of claim 4, wherein identifying the duplicate files includes comparing each extended package only to its immediate previous package.

7. The method of claim 1, wherein the software is CAD/CAM software, and wherein each package has at least 100,000 files.

8. The method of claim 1, wherein user-specific information is removed from the new files prior to creation of the deployment package, whereby an end user can add user-specific information after installation of the deployment package.

9. The method of claim 1, wherein creating the deployment package includes creating compressed files while enforcing number and file size requirements per compressed file.

10. A system comprising a first computer and an end user computer, the first computer programmed to:
    create indices of files for an extended software package and a previous package, the indices identifying properties of the files for each of the extended software package and the previous package, the extended package including all files of the previous package plus new files;
    compare the properties of the files listed in the indices to identify duplicate files in the extended package and the new files in the extended package; and
    create, at the first computer, a deployment package that includes only the new files in the extended package for installation on the end user computer and also a first validation file that identifies all files that should be installed on an end user computer;
    the end user computer programmed to install the deployment package and create a second validation file for those files actually installed on the end user computer, and compare the first and second files, whereby installation is successful if the first and second validation files are identical.

11. The system of claim 10, wherein the first computer is programmed to create a cryptographic hash function for each file; and wherein the first computer is programmed to compare the files by comparing the cryptographic hash functions.

12. The system of claim 10, wherein the first computer is further programmed to send the deployment package to the end user computer and other end user computers in an enterprise system.

13. The system of claim 10, wherein identifying the duplicate files includes:
    computing a hash of each one of the files in the indices to produce a fingerprint for each one of the files; and
    iterating the indices of the base and extended packages to identify the duplicate files, wherein the fingerprints are compared to identify the duplicate files and the new files in the extended package.

\* \* \* \* \*